US012575680B2

(12) United States Patent
Skilnick et al.

(10) Patent No.: US 12,575,680 B2
(45) Date of Patent: Mar. 17, 2026

(54) CONVERTIBLE PLATFORM FOR SUPPORTING A USER

(71) Applicant: The ERGO Baby Carrier, Inc., Torrance, CA (US)

(72) Inventors: Edward William Skilnick, Mission Viejo, CA (US); Kevin Dann Scheiferstein, Long Beach, CA (US); Eric William Childs, San Diego, CA (US); Petty Rader, San Diego, CA (US)

(73) Assignee: The ERGO Baby Carrier, Inc., Torrance, CA (US)

( * ) Notice: Subject to any disclaimer, the term of this patent is extended or adjusted under 35 U.S.C. 154(b) by 661 days.

(21) Appl. No.: 17/975,244

(22) Filed: Oct. 27, 2022

(65) Prior Publication Data

US 2023/0371713 A1 Nov. 23, 2023

Related U.S. Application Data

(60) Provisional application No. 63/343,393, filed on May 18, 2022.

(51) Int. Cl.
*A47C 13/00* (2006.01)
*A47C 4/04* (2006.01)
(Continued)

(52) U.S. Cl.
CPC ................ *A47C 13/00* (2013.01); *A47C 4/04* (2013.01); *A47C 4/10* (2013.01); *A47C 4/20* (2013.01);
(Continued)

(58) Field of Classification Search
CPC .. A47C 13/00; A47C 4/04; A47C 4/10; A47C 4/20; A47C 5/10; A47D 1/002;
(Continued)

(56) References Cited

U.S. PATENT DOCUMENTS 656,946 A * 8/1900 Corduan .................. E06C 1/39
182/123
4,109,961 A * 8/1978 Opsvik .................. A47D 1/002
D6/350
(Continued)

OTHER PUBLICATIONS

PCT Patent Application PCT/US2023/021710 International Search Report and Written Opinion of the International Searching Authority issued Sep. 23, 2023.
(Continued)

*Primary Examiner* — Robert Canfield
(74) *Attorney, Agent, or Firm* — Erise IP, P.A.

(57) ABSTRACT

A convertible platform for supporting a user in a standing or seated position is presented. In some embodiments, the convertible platform presents a set of front legs and a set of back legs that pivot about a pivot hinge to a preferred angle. The set of front legs and the set of back legs provide a base for supporting various attachment devices. The various attachment devices may comprise attachment members for attaching to base members for supporting the attachment device. The various attachment devices may be configured for supporting infants, toddlers, children, and adults in both standing and sitting positions. Furthermore, various attachments may be connected between the sets of legs for providing steps, platforms, shelves, and seats for the various users and/or objects.

20 Claims, 12 Drawing Sheets

(51) Int. Cl.

| | |
|---|---|
| ***A47C 4/10*** | (2006.01) |
| ***A47C 4/20*** | (2006.01) |
| ***A47C 5/10*** | (2006.01) |
| ***A47C 11/00*** | (2006.01) |
| ***A47D 1/00*** | (2006.01) |
| ***A47D 1/02*** | (2006.01) |
| ***A47D 11/00*** | (2006.01) |
| ***E06C 1/39*** | (2006.01) |
| ***E06C 7/18*** | (2006.01) |

(52) U.S. Cl.
CPC ................ *A47C 5/10* (2013.01); *A47D 1/002* (2013.01); *A47D 1/006* (2013.01); *A47D 1/008* (2013.01); *A47D 1/0081* (2017.05); *A47D 1/0085* (2017.05); *A47D 1/02* (2013.01); *A47D 1/023* (2017.05); *A47D 11/00* (2013.01); *E06C 1/39* (2013.01); *E06C 7/182* (2013.01)

(58) Field of Classification Search
CPC ...... A47D 1/006; A47D 1/008; A47D 1/0081; A47D 1/0085; A47D 1/02; A47D 1/023; A47D 11/00; A47D 1/004; A47D 1/04; A47D 13/08; A47D 15/006; E06C 1/39; E06C 7/182
USPC ............. 182/33, 35; 297/29, 46, 118, 283.3, 297/440.14–440.16, 440.2, 440.21, 451.8
See application file for complete search history.

(56) References Cited

U.S. PATENT DOCUMENTS

| | | | | | |
|---|---|---|---|---|---|
| 5,584,357 | A * | 12/1996 | Gugel | E06C 7/182 | 248/238 |
| 6,974,188 | B2 * | 12/2005 | Turner | A47C 7/445 | 297/285 |
| 7,017,986 | B2 * | 3/2006 | Degen | A47C 4/20 | 297/58 |
| 8,960,788 | B2 * | 2/2015 | Chuah | A47D 1/004 | 297/151 |
| 10,806,264 | B1 * | 10/2020 | Chen | A47C 7/029 | |
| 11,172,764 | B2 * | 11/2021 | Tackaberry | A47D 1/002 | |
| 11,723,477 | B2 * | 8/2023 | Rogers | A47D 1/103 | 297/118 |
| D1,075,327 | S * | 5/2025 | Chuah | D6/339 | |
| 12,329,287 | B2 * | 6/2025 | Li | A47C 3/26 | |
| 2003/0168894 | A1 * | 9/2003 | Lin | A47C 4/24 | 297/55 |
| 2004/0239153 | A1 * | 12/2004 | Leng | A47C 4/20 | 297/56 |
| 2007/0257524 | A1 * | 11/2007 | Huang | A47C 3/04 | 297/16.1 |
| 2007/0284192 | A1 * | 12/2007 | Meyers | A47C 12/00 | 182/129 |
| 2010/0170750 | A1 * | 7/2010 | Leng | E06C 7/083 | 182/228.2 |
| 2013/0069398 | A1 * | 3/2013 | Chuah | A47D 1/0085 | 297/135 |
| 2017/0172304 | A1 * | 6/2017 | Piretti | A47C 4/04 | |
| 2018/0148977 | A1 * | 5/2018 | Leng | E06C 1/393 | |
| 2019/0231087 | A1 * | 8/2019 | Dziak | A47D 1/023 | |
| 2019/0330920 | A1 * | 10/2019 | Boyer | E06C 1/383 | |
| 2020/0063493 | A1 * | 2/2020 | Yoo | E06C 7/182 | |
| 2020/0217134 | A1 * | 7/2020 | Fortier | E06C 1/22 | |
| 2020/0240209 | A1 * | 7/2020 | Zhu | E06C 1/22 | |
| 2020/0325726 | A1 * | 10/2020 | Yoo | E06C 1/18 | |
| 2020/0378183 | A1 * | 12/2020 | Zhu | E06C 7/083 | |
| 2020/0378185 | A1 * | 12/2020 | Leng | E06C 7/06 | |
| 2020/0383490 | A1 * | 12/2020 | Tackaberry | A47D 11/00 | |
| 2020/0386050 | A1 * | 12/2020 | Mittanck | E06C 1/383 | |
| 2021/0037989 | A1 * | 2/2021 | Rogers | A47D 1/04 | |
| 2021/0059414 | A1 * | 3/2021 | Leng | A47C 3/40 | |
| 2021/0378405 | A1 * | 12/2021 | Boyer | A47D 13/08 | |
| 2024/0081535 | A1 * | 3/2024 | Hess | A47C 4/52 | |
| 2024/0141729 | A1 * | 5/2024 | Leng | E06C 7/182 | |
| 2024/0301751 | A1 * | 9/2024 | Leng | E06C 1/393 | |
| 2024/0301752 | A1 * | 9/2024 | Leng | E06C 1/20 | |
| 2024/0382003 | A1 * | 11/2024 | Leng | A47C 5/06 | |
| 2025/0049228 | A1 * | 2/2025 | Longenecker | A47D 1/008 | |
| 2025/0072614 | A1 * | 3/2025 | Li | A47D 1/002 | |
| 2025/0101805 | A1 * | 3/2025 | Papa | E06C 7/14 | |

OTHER PUBLICATIONS

"Sit-To-Step High Chair", Skip Hop, Carter's, Inc., 2022, https://web.archive.org/web/20220316031907/https://www.skiphop.com/skiphopinfant-feeding, 48 pages of screen shots.

"Kitchen Helper", Guidecraft, 2022, https://web.archive.org/web/20220810142022/https://guidecraft.com/kitchen-helper-furniture/, 8 pages of screenshots.

PCT Patent Application PCT/US2023/021710 International Preliminary Report on Patentability issued Nov. 7, 2024.

* cited by examiner

CONVERTIBLE PLATFORM FOR SUPPORTING A USER

RELATED APPLICATIONS

This patent application claims priority benefit, with regard to all common subject matter, of U.S. Provisional Patent Application No. 63/343,393, filed May 18, 2022, and entitled "CONVERTIBLE PLATFORM FOR SUPPORTING A USER". The identified patent application is hereby incorporated by reference in its entirety into the present application.

BACKGROUND

1. Field

Embodiments of the present teachings are directed to a convertible platform for supporting a user. Specifically, embodiments of the present teachings are directed to a convertible platform comprising attachment devices for supporting a child in a standing position and/or a seated position.

2. Related Art

In typical households with children, many child furniture apparatuses are used to assist in performing various tasks to meet the needs of the children and parents. For example, a highchair may be utilized for a child to sit at a height that is convenient for a parent to interact with the child while eating and playing. A step stool may be utilized for a child to reach a countertop or a sink. These child furniture apparatuses are typically used once a day at dinner time or play time. While not being used, these child furniture apparatuses can be cumbersome and typically sit in a kitchen or dining area cluttering usable space.

Furthermore, when the child furniture apparatuses are used, they are typically not adjustable for a growing child, and the child quickly becomes too large for the child furniture apparatus to support the larger child or adult. The large child furniture apparatuses are no longer usable and must be discarded after only a year or two of use.

What is needed is a convertible platform comprising a support base supporting configurable attachment devices for supporting users of any age and size in sitting and standing positions.

SUMMARY

Embodiments of the disclosure solve the above-described problems by providing a convertible platform comprising a base with modular steps and platforms for supporting the user. Furthermore, the convertible platform comprises attachment devices for supporting users of all ages and sizes in sitting and standing positions.

A first embodiment is directed to a convertible platform for supporting a user in a seated position or a standing position. The convertible platform comprises a base comprising a set of front legs and a set of back legs, wherein the set of front legs comprise a distal end proximate a surface supporting the convertible platform and a proximal end opposite the distal end, attachment points disposed on each front leg of the set of front legs at the proximal end, a platform attached to each front leg of the set of front legs at the attachment points, a pivot hinge connecting the set of front legs and the set of back legs and providing rotation of the set of front legs relative to the set of back legs, and base attachment members, wherein the base attachment members are an extension of the set of front legs at the proximal end, and an attachment device for attaching to the base and supporting the user, the attachment device comprising attachment device attachment members configured to attach to the base attachment members, wherein the attachment device is configured to support the user in a standing or sitting position.

A second embodiment is directed to a convertible platform for supporting a user in a seated position or a standing position. The convertible platform comprises a base comprising a set of front legs and a set of back legs, wherein the set of front legs comprise a distal end proximate a surface supporting the convertible platform and a proximal end opposite the distal end, attachment points disposed on an inner side of each front leg of the set of front legs, a pivot hinge connecting the set of front legs and the set of back legs and providing rotation of the set of front legs relative to the set of back legs, and base attachment members, wherein the base attachment members are a linear extension of the set of front legs at the proximal end, an attachment device for attaching to the base and supporting the user, the attachment device comprising attachment device attachment members configured to attach to the base attachment members, wherein the attachment device is configured to support the user in a standing or sitting position.

A third embodiment is directed to a convertible platform for supporting a user in a seated position or a standing position. The convertible platform comprises a base. The base comprises a set of front legs and a set of back legs, attachment points disposed on each front leg of the set of front legs, a platform attached to each front leg of the set of front legs at the attachment points, a pivot hinge connecting the set of front legs and the set of back legs and providing rotation of the set of front legs relative to the set of back legs, wherein the set of front legs comprises a distal end proximate a surface supporting the convertible platform and a proximal end opposite the distal end, base attachment members configured to receive an attachment device for supporting a user, wherein the base attachment members are an extension of the set of front legs at the proximal end.

A fourth embodiment is directed to convertible platform for supporting a user in a seated position or a standing position. The convertible platform comprises a base comprising a set of front legs and a set of back legs, wherein the set of front legs comprises a distal end proximate a surface supporting the convertible platform and a proximal end opposite the distal end, attachment points disposed on each front leg of the set of front legs, a platform attached to each front leg of the set of front legs at the attachment points, a pivot hinge connecting the set of front legs and the set of back legs and providing rotation of the set of front legs relative to the set of back legs, and base attachment members configured to receive an attachment device for supporting the user, wherein the base attachment members are an extension of the set of front legs at the proximal end.

A fifth embodiment is directed to any of embodiments one through four, wherein the base attachment members are hollow and receive the attachment device attachment members and further comprising a set of attachment locking mechanisms and a set of base locking mechanisms configured to lock the attachment device on the base, wherein the set of attachment locking mechanisms is a set of spring-loaded pins and the set of base locking mechanisms is a set of holes configured to receive the set of spring-loaded pins.

A sixth embodiment is directed to any of embodiments one through five, wherein the attachment device is one of a highchair or a guardrail providing 180-degree or 360-degree support.

A seventh embodiment is directed to any of embodiments one through six, further comprising a U-shaped seat and sidewalls for securing a child in the highchair, an adjustable backrest for adjusting based on a height of the child, and a selectively attachable tray configured to attach to the sidewalls.

An eighth embodiment is directed to any of embodiments one through seven wherein the highchair further comprises a selectively attachable tray. The selectively attachable tray comprises a lever for actuating spring-loaded protrusions for attaching the selectively attachable tray to the sidewalls of the highchair.

A ninth embodiment is directed to any of embodiments one through eight, wherein the attachment device is disposed in a reclined position based on a first angle between the set of front legs and the set of back legs, and wherein the first angle provides a second angle of the base attachment members relative to the surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
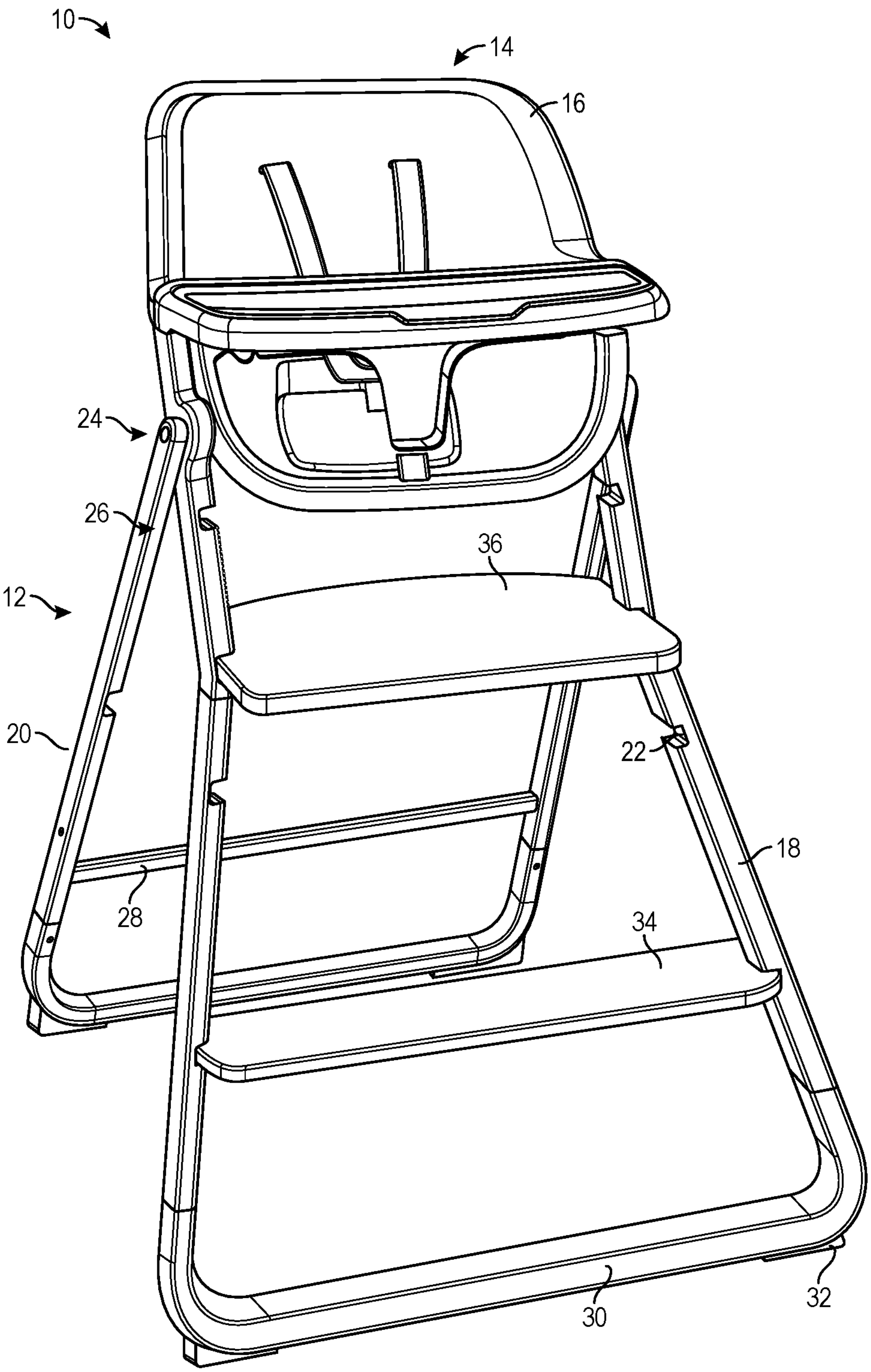
FIG. 1 depicts an embodiment of a convertible platform.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the present disclosure relate to a convertible platform comprising a base for receiving selectively attachable attachment devices for supporting a user, such as, an infant, a toddler, a child, and, in some embodiments, an adult. The base may be foldable for storage in a folded configuration or unfolded into a deployed configuration for use. The base may receive and secure steps for users to climb the base to the selectively attachable attachment device. The base may comprise base attachment members for attaching the attachment device. In some embodiments, the base attachment members may be extensions of the front legs or ends of the front legs. In some embodiments, the attachment devices may comprise chairs, seats, platforms, guard rails, bathtubs, bassinettes, and the like for supporting users in standing and sitting positions. In some embodiments, the attachment device may provide forms of entertainment or education and may be an easel, abacus, chalkboard, whiteboard, touchscreen, or the like. For example, the attachment device may be a highchair and provide a seat for a child to sit and be strapped in for security. The guard rail may be attached to the base and provide a 360-degree rail for the child to hold while standing. In some embodiments, the convertible platform may support a user of any age or size in a sitting or standing position.

FIG. 1 depicts convertible platform 10 comprising base 12 and attachment device 14. In the configuration shown, convertible platform 10 is configured for supporting a user in attachment 14, which, in the embodiments shown, is highchair 16 for supporting a child. In some embodiments, attachment device 14 may be selectively attachable to base 12. As such, highchair 16 may be removed and replaced with, for example, backrest 52 (FIG. 3), guard rail 46 (FIGS. 4A-4B), or any other exemplary attachment device 14 described herein.

In some embodiments, front legs 18 and back legs 20 comprise attachment points 22. Front legs 18 may be one, a set, or a plurality of legs that work in conjunction with one, a set, or a plurality of back legs 20 for supporting the user and attachment device 14. Front legs 18 and back legs 20 may be connected at pivot hinge 24. Pivot hinge 24 may allow front legs 18 to pivot about pivot hinge 24 relative to back legs 20 providing angle 26 between front legs 18 and back legs 20. Angle 26 between front legs 18 and back legs

20 may provide a range as small as zero degrees providing a folded configuration (FIG. 7) to greater than 45 degrees or any angle in between providing the configuration as shown in FIG. 1. Furthermore, pivot hinge 24 may provide a blocking or locking mechanism to prevent the rotation of front legs 18 relative to back legs 20 beyond a specified angle. As such, front legs 18 and back legs 20 provide a stable base for the user and attachment device 14.

In some embodiments, convertible platform 10 may be configured to support children and/or adults up to a specified weight. Convertible platform 10 may comprise lateral strut 28 and lower strut 30 providing stability. In some embodiments, lateral strut 28 and lower strut 30 may be a plurality of lateral struts and may be disposed between each of front legs 18 and/or each of back legs 20. Lateral strut 28 and lower strut 30 may be provided between any legs of base 12 to add structure to aid in stability and structural integrity and to prevent separation of adjoined legs. Furthermore, lateral strut 28 and lower strut 30 may add weight to base 12 near the floor, lowering the center of gravity of convertible platform 10 resulting in increased stability for the user sitting above the center of gravity. Lateral strut 28 and lower strut 30, as with any portion of convertible platform 10, may comprise wood, plastic, metal, or any combination of materials, and may be attached to front legs 18 and back legs 20 by screws, bolts, snaps, or any other fastener. In some embodiments, lateral strut 28 and/or lower strut 30 may be molded as a single piece of base 12 or may be welded. In some embodiments, convertible platform 10 may be configured to support children up to 100 pounds and/or adults up to 300 pounds. As such, it should be understood that various sizes of elements and materials of convertible platform 10 may be manufactured for various shapes and sizes of expected users.

In some embodiments, lower strut 30 comprises footings 32. Footings 32 comprise any material that alters contact between lower strut 30 and the surface below (e.g., the floor). In some embodiments, footings 32 may comprise rubber, plastic, felt, and/or any material suitable for the application of convertible platform 10. In some embodiments, footings 32 may be soft such that footings 32 do not damage the floor. Furthermore, footings 32 may be a material with a high coefficient of friction to reduce slipping on typical floors.

Convertible platform 10 may be presented in various embodiments comprising various steps and footrests in various locations provided by attachment points 22. The steps and footrests may be interchangeable and selectively attachable at any of attachments points 22 to support various heights and leg lengths of people of all shapes and sizes. In some embodiments, base 12 may further comprise step 34 for stepping up into highchair 16 or for use as a footrest. Step 34 as well as platform 36, may be placed in any attachment points 22. As such, any arrangement of platform 36 and step 34 is possible provided by attachment points 22. As shown in FIG. 1, platform 36 is used as a footrest/step and step 32 is used as a step to get to highchair 16. In some embodiments, platform 36 may be used as a step, seat, table, or any other application. Platform 36 and step 34 are discussed in more detail in further embodiments below.

Figure 2:
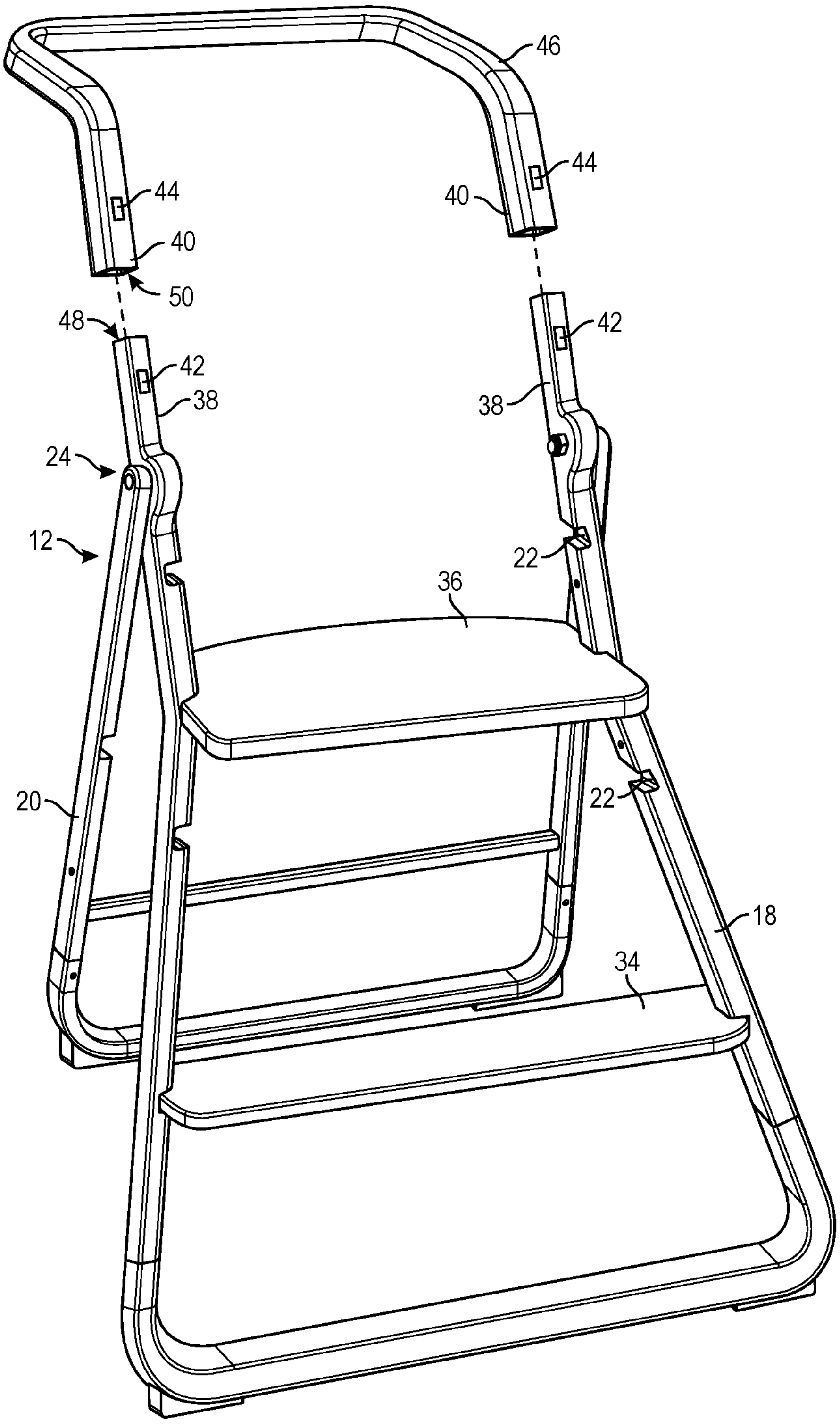
FIG. 2 depicts an embodiment of the convertible platform comprising a base and an exemplary attachment device.

FIG. 2 depicts base 12 comprising front legs 18, back legs 20, step 34, platform 36, and base attachment members 38. In some embodiments, one, a set, or a plurality of base attachment members 38 are an extension of front legs 18 and configured for selectively attaching attachment device 14. Attachment device 14 may be highchair 16, backrest 52 (FIG. 3), guard rail 46 (FIGS. 4A-4B), or any other attachment device described herein. Here, exemplary guard rail 46 is depicted. Any attachment device may be imagined.

In some embodiments, front legs 18 may extend beyond pivot hinges 24 providing base attachment members 38 for inserting into or receiving attachment device 14. Furthermore, attachment device 14 may comprise one, a set, or a plurality of attachment device attachment members 40 for inserting into or receiving base attachment members 38. Base attachment members 38 may be disposed on an end of front legs 18 proximal attachment device 14 above pivot hinges 24. In some embodiments, base attachment members 38 may comprise a slightly smaller cross-sectional area 48 than an inner surface 50 of attachment device attachment members 40. As such, base attachment members 38 may slide into attachment device attachment members 40 as shown. Base attachment members 38 may then support attachment device 14 by securing attachment device attachment members 40 inside base attachment members 38 as shown.

In some embodiments, attachment device attachment members 40 may comprise a larger cross-sectional hollow portion than an outer surface of base attachment members 38. As such, in some embodiments, base attachment members 38 may receive attachment device attachment members 40. As shown, guard rail 46 comprises attachment device attachment members 40 configured to receive base attachment members 38.

In some embodiments, base attachment members 38 may comprise base locking mechanism 42 for interaction with attachment locking mechanism 44 to lock attachment 14 in place on base 12. Base locking mechanism 42 may be spring loaded, and/or may be a compressible protrusion that, when attachment device attachment member 40 slides over base locking mechanism 42, base locking mechanism 42 is depressed. When base locking mechanism 42 is depressed, base attachment members 38 may receive attachment device attachment members 40. In some embodiments, attachment locking mechanism 44 may be a hole, or socket, for receiving base locking mechanism 42, which, in some embodiments, may be a spring-loaded ball or shaft. When attachment locking mechanism 44 slides over base locking mechanism 42, base locking mechanism 42 may extend into attachment locking mechanism 44 to lock attachment device 14 in place. Similarly, to remove attachment device 14 from base 12, the user may depress base locking mechanism 42 and pull attachment device 14 away from base 12 sliding attachment device attachment members 40 off base attachment members 38.

In some embodiments, base attachment members 38 may be an extension of front legs 18. As such, an angle of the attachment relative to the floor may be based on angle 26. For example, as depicted in FIG. 2, the wider angle 26 the more reclined front legs 18 will be and, consequently, the more reclined guard rail 46 will be. Because attachment device 14 is attached to front legs 18 and front legs 18 require a minimum angle to support attachment device 14 and the user, attachment device 14 angle relative to the floor may be based on angle 26. Attachment device 14 relative recline based on angle 26 is discussed in more detail below.

In some embodiments, base attachment members 38 may be hollow and receive attachment device attachment members 40 therein. Attachment locking mechanism 44 may protrude from attachment device attachment members 40 by a spring forcing the protrusion. Base locking mechanism 42 may be a hole configured to receive the protruding attachment locking mechanism 44. The user may slide device attachment members 40 into the hollow portion of base attachment members 38. When attachment locking mechanism 44 moves over base locking mechanism 42 (holes), attachment locking mechanism 44 may extend into base locking mechanism 42 locking attachment device 14 (e.g., guard rail 46 of FIG. 2) into place. The user may simply depress attachment locking mechanism, thereby compressing the internal spring, to allow attachment device 14 to be removed from the hollow portion of base attachment members 38.

Figure 3:
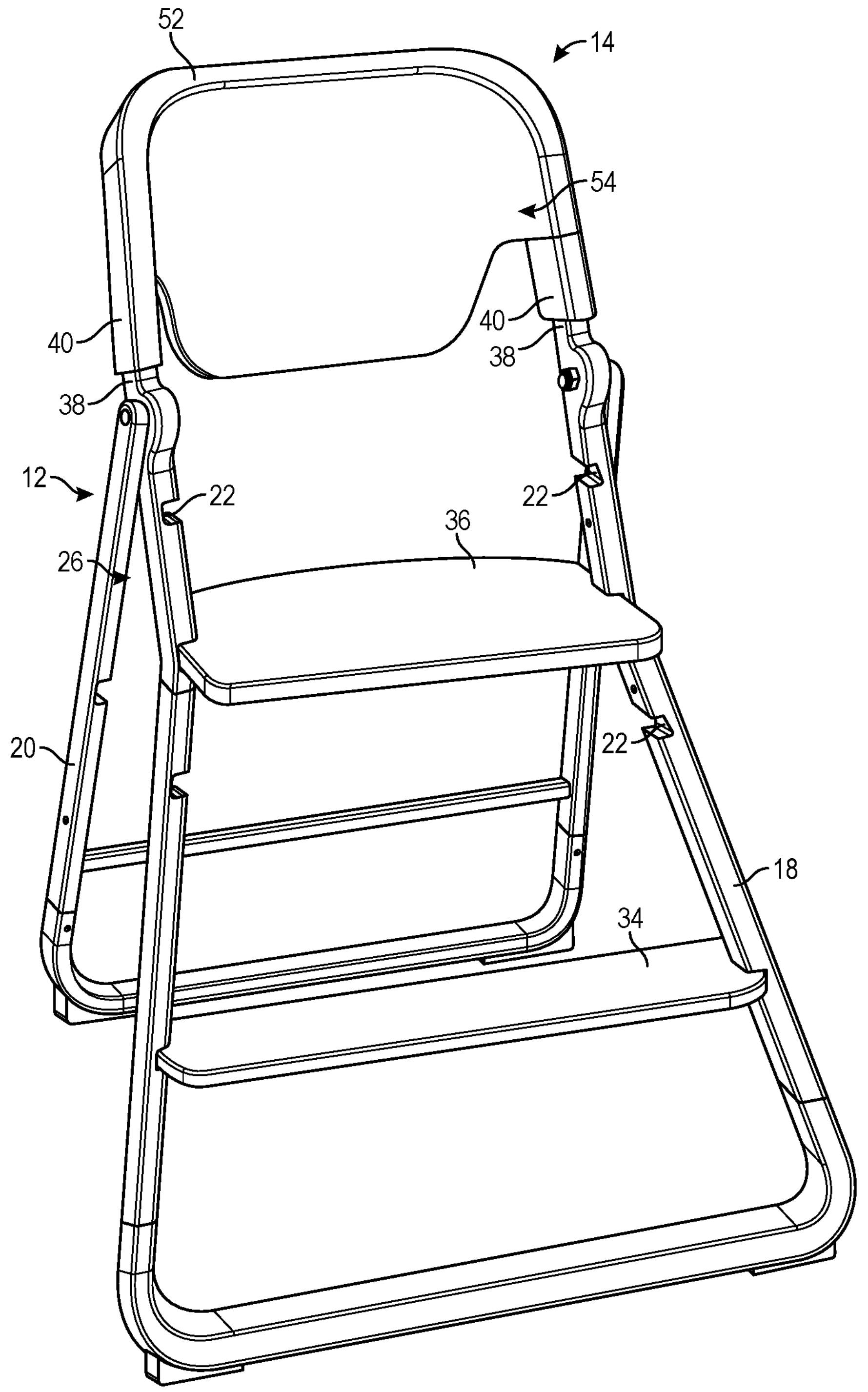
FIG. 3 depicts an exemplary backrest attachment device for some embodiments of the convertible platform.

FIG. 3 depicts base 12 in a chair configuration comprising backrest 52 and platform 36 providing a seat for a user. In some embodiments, platform 36 may attach to front legs 18 such that platform 36 may act as a seat providing a sitting or standing surface that is substantially parallel to the floor/ground or surface on which base 12 is resting. In some embodiments, attachment points 22 are angled relative to front legs 18 such that attachment points 22 provide a groove that is substantially parallel the floor and provided on an inner side of front legs 18. When base 12 is fully open to a standing configuration (e.g., angle 26 is maximum), attachment points 22 may provide grooves parallel to the floor on which convertible platform 10 is standing. Therefore, platform 36 may be substantially parallel with the floor. Platform 36 may provide a seat, a step, a shelf, or any platform for a user and/or object. Attachment device 14 may therefore be in a reclining position based on angle 26 and similarly based on the angle of front legs 18 with the floor. Each attachment device 14 may be designed to provide an angle sufficiently comfortable for the user depending on the configuration of convertible platform 10 comprising attachment device 12.

FIG. 3 depicts exemplary backrest 52. Backrest 52 may be attached to base attachment members 38 at attachment device attachment members 40. Here, attachment device attachment members 40 comprise a slightly larger hollow cross section than the outer surface of base attachment members 38. Therefore, attachment device attachment members 40 may receive base attachment members 38. Any base locking mechanism 42 and attachment locking mechanism 44 described above may be used to lock backrest 52 to base 12. Backrest 52 may be designed to provide reclined support for the user sitting on platform 38 while considering angle 26. Back portion 54 of backrest 52 may be substantially aligned with front legs 18 or may be slightly angled forward or backward to provide a comfortable reclined sitting position. Furthermore, back portion 54 may be concave and comprise a soft material to provide a comfortable position for the user.

As shown, base attachment members 38 are a direct, linear extension of front legs 18. However, base attachment members 38 may be angled from front legs 18 to provide an angle for attachment device 14. Base attachment members 38 may be angled relative to front legs 18 to provide a comfortable angle for attachment device 14 such that, for example, highchair 16 provides a flat or slightly reclined surface for sitting and a reclined backrest, guard rail 46 is level, backrest 52 is reclined, and the like.

In some embodiments, step 34 and platform 36 may be selectively attached to front legs 18 and back legs 20 at attachment points 22. As described above, attachment points 22 may provide a flat groove (parallel to the floor) for receiving and supporting step 34 and/or platform 36. Attachment points 22 may be angled relative to the front legs 18 based on angle 26 to provide step 34 and platform 36 substantially parallel to the floor. This allows the user to climb onto and sit on platform 36 in the chair configuration shown in FIG. 3. In this exemplary embodiment, the user may be of any age and size. Step 34 and platform 36 may be set to any height based on the size of the user or to provide a shelf for objects. As such, convertible platform 10 may provide seating for any age, size, and shape, of the user. Embodiments of backrest 52 may be plastic, wood, fabric, rubber, foam, or any combination of materials.

Figure 4A:
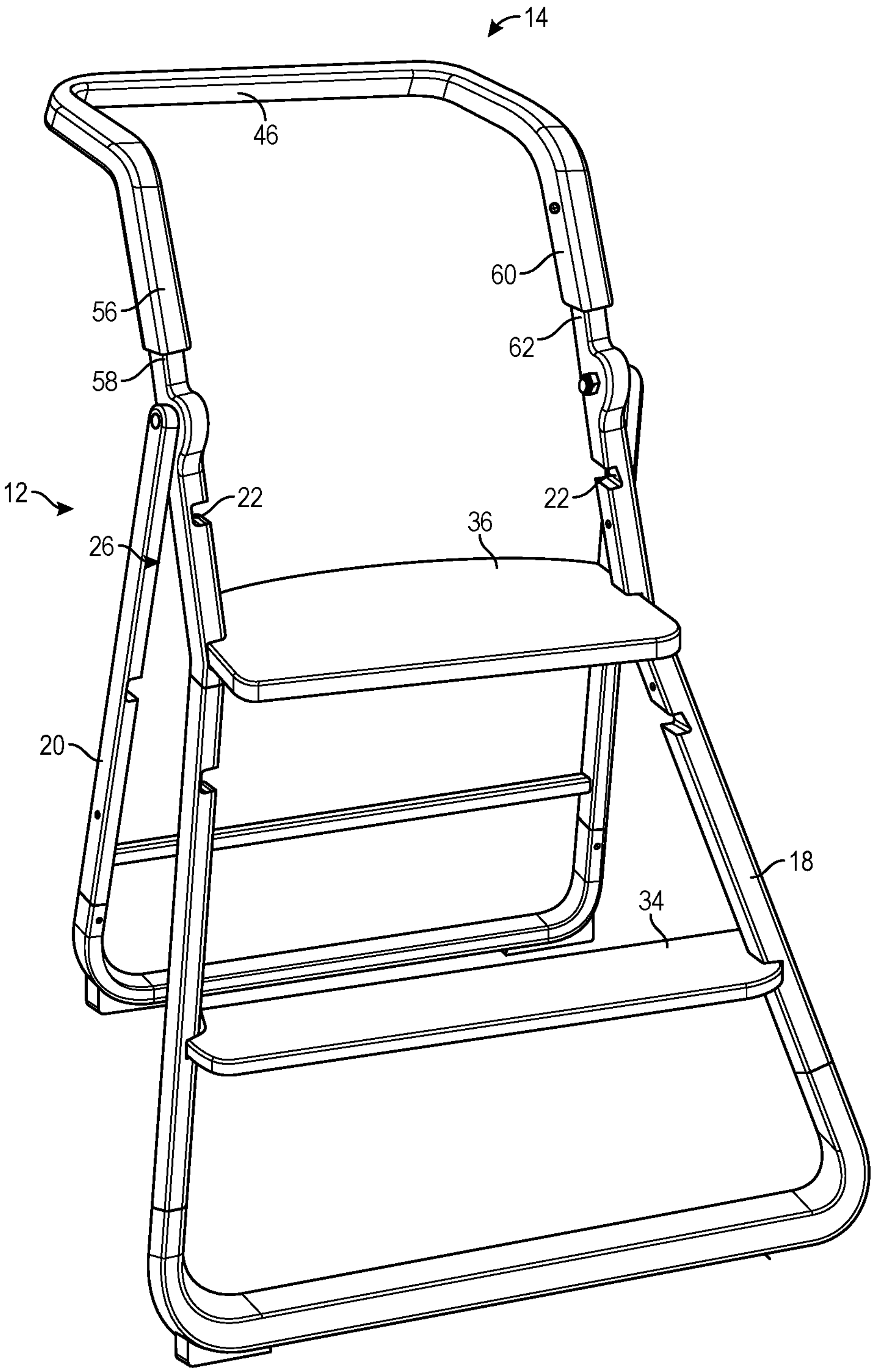
FIGS. 4A-4C depict exemplary guard rail attachment devices and platforms for some embodiments of the convertible platform.
Figure 4B:
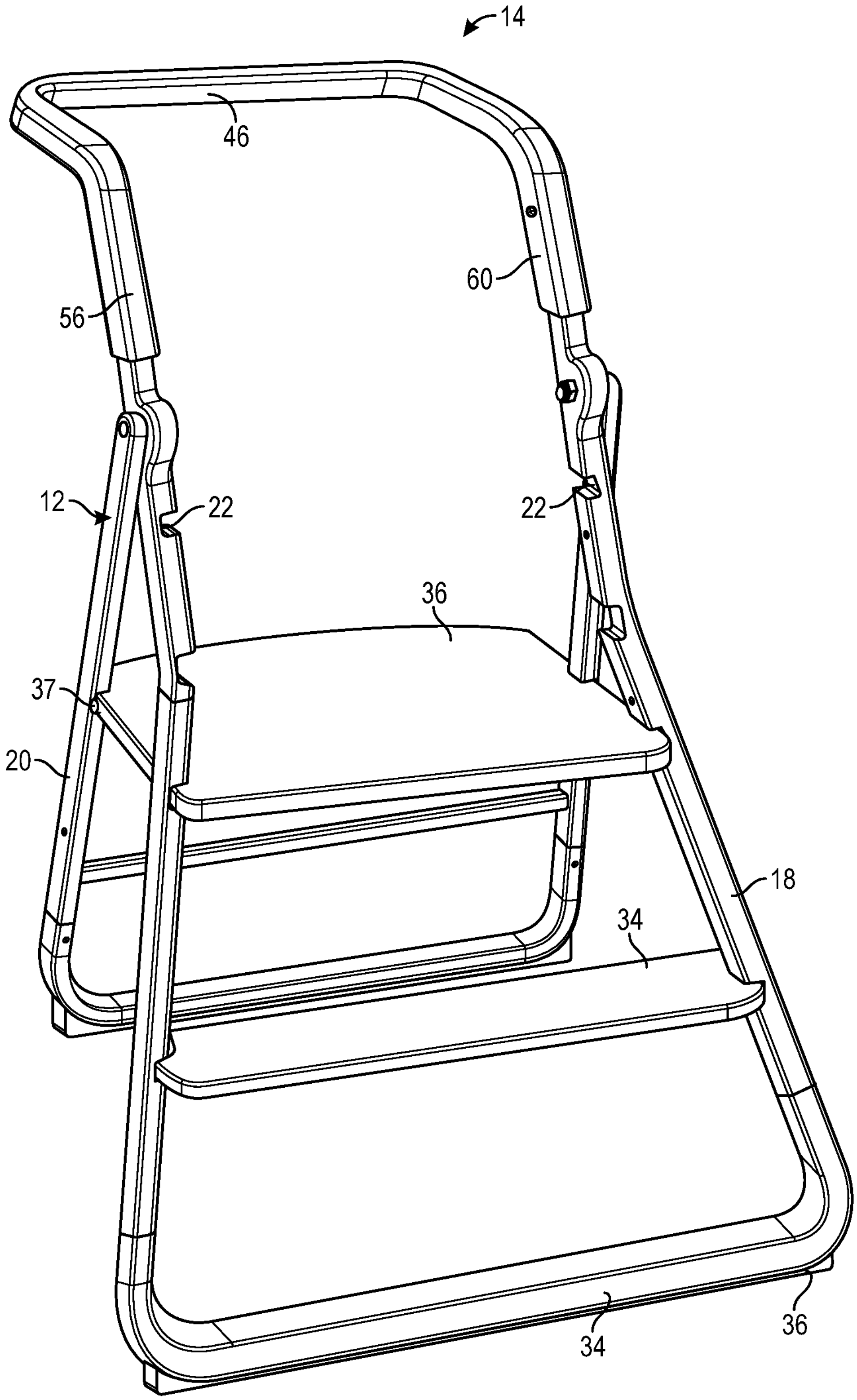
Figure 4C:
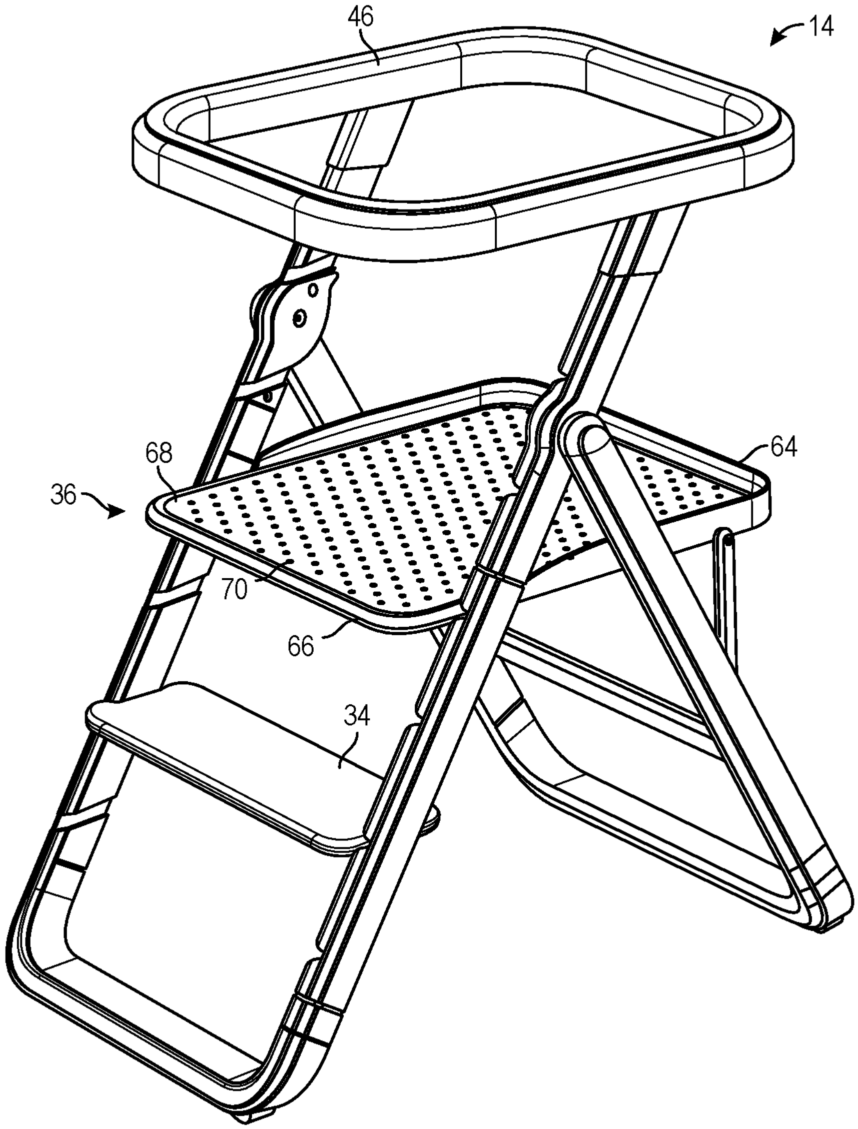

FIGS. 4A-4C depict an exemplary guard rail 46 for attaching to base 12. FIG. 4A depicts guard rail 46 surrounding substantially 180 degrees of the user supported on platform 36. In some embodiments, guard rail 46 provides a support for a child to grab while standing on platform 36. The child may use step 34 to climb onto platform 36 and hold guard rail 46 for support while standing. First end 56 of guard rail 46 may attach to a first base attachment member 58 and second end 60 of guard rail 46 may attach to second base attachment member 62 and guard rail may be continuous between providing a single 180-degree support guard rail 46. In some embodiments, guard rail 46 covers substantially 180 degrees as shown in FIG. 4A and, in some embodiments, guard rail 46 covers substantially 360 surrounding the child as shown in FIG. 4B.

FIG. 4B depicts platform 36 connecting to both front legs 18 and back legs 20 at front attachment points **22*a* and rear attachment points 22*b*. In some embodiments, platform 36 may be configured to couple to either front legs 18 or back legs 20 or front legs 18 and back legs 20. Platform 36 may slide into the attachment points 22 and be held in place based on friction or platform attachment 37 may hold platform 36** in place.

In some embodiments, platform 36 may comprise platform attachment 37. Platform attachment 37 may be spring-loaded to lock platform 36 in front attachment points **22*a* and back attachment points 22*b*. Platform attachment 37 may be a small protrusion that may depress into the side of platform 36 when pressed in by hand or pressed in by sliding platform 36 into place. For example, platform attachment 37 may be configured with angles such that when sliding platform 36 into position to be locked between front legs 18 and back legs 20, an acute angle on platform attachment provides force against back legs to compress the interior spring and depress platform attachment 37. Furthermore, the side of the platform attachment 37 contacting back legs 20 may be configured at an angle closer to 90 degrees that does not allow platform attachment 37 to depress when pressed against back legs 20. The user may depress platform attachment 37 by hand to slide platform 36 out, removing platform 36 from between the legs. This locks platform 36 into place between front legs 18 and back legs 20 preventing unwanted movement of platform 36. Similarly, or alternatively, platform attachments 37 may be disposed near front legs 18 and function as describe above in relation to back legs 20**.

FIG. 4C depicts an embodiment of guard rail 46 providing substantially 360 degrees of support. As shown, guard rail 46 may provide continuous support for 360 degrees surround the user. Furthermore, in some embodiments, one of the sides of guard rail 46 may provide a door and hinge (not shown) open and securely close providing an access or an entrance and exit point for the user. The door and hinge may lock securely allowing a child to use guard rail 46 without accidentally opening the door.

In some embodiments, any parts of platform 36 shown in 4B may be added or combined with platform 36 illustrated in any other figures described herein. In some embodiments, platform 36 comprises lip 64. Lip 64 may be a raised portion near an edge of platform 36 providing tactile feedback to the user while standing. The user may stand on platform 36 and feel lip 64 with their feet. Lip 64 may provide tactile feedback to the user such that the user understands where the edge of platform 36 is and does not step off the edge.

Furthermore, platform 36 may comprise drip tray 66 and/or a channel (not shown) for receiving spills. For example, if a child standing on platform 36 spills liquids, the liquids may be caught in drip tray 66 or in the channel and collect away from the child's feet. Drip tray 66 may be provided under a top surface 68 of platform 36. Drip tray 66 may be removed and dumped and cleaned easily. In some embodiments, holes 70 may be provided in top surface 68 of platform 36 to receive and transfer any spilled liquids to drip tray 66 keeping top surface 68 dry for the child. In some embodiments, top surface 68 of platform 36 and/or step 34 comprises tread for providing a high-friction surface for the child to stand. The high-friction surface may provide a grip for the child's feet or shoes, so the child does not easily slip on platform 36 when platform 36 is wet.

In some embodiments, guard rail 46 may attach to base 12 by base attachment members 38 and attachment device attachment members 40 as described above. Furthermore, base attachment members 38 and attachment device attachment members 40 may provide adjustable height to guard rail 46 for various heights of children. As described above, a plurality of locking mechanisms may be disposed on base attachment members 38 and attachment device attachment members 40 allowing height adjustments of attachment device 14.

Figure 5A:
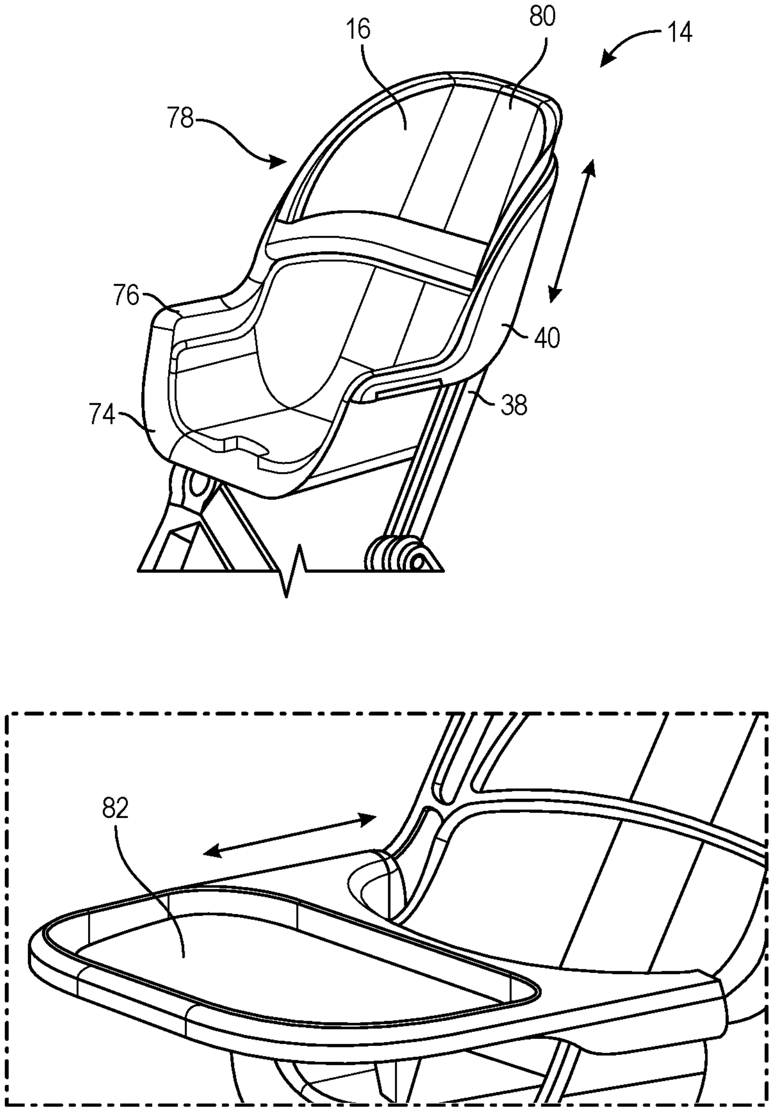
FIG. 5A depicts an exemplary highchair attachment device for embodiments of the convertible platform.

Illustrated in FIG. 5A is an embodiment of highchair 16 for supporting the child in a seated position. In some embodiments, highchair 16 may be selectively attached to base 12 by attachment device attachment members 40 interacting with base attachment members 38 as described above. In some embodiments, attachment device attachment members 40 may be slightly larger than base attachment members 38 for receiving base attachment members 38 in a telescopic fashion. In some embodiments, highchair 16 may comprise concave seat 74 for receiving the child. Concave seat 74 may be U-shaped to provide free leg movement of the child. The U-shape of concave seat 74 may provide an unobstructed area for the child's legs to freely move while maintaining security for the child by straps (not shown). The straps may be provided between the child's legs as well as wrap the waist of the child and be connected to highchair 16 to secure the child. In some embodiments, concave seat 74 comprises sidewalls 76 for providing lateral support to the sitting child.

In some embodiments, highchair comprises adjustable backrest 78 for support the back and sides of the child. Adjustable backrest 78 may again be U-shaped connecting to concave seat 74 and sidewalls 76 to wrap around the child's body. In some embodiments, adjustable backrest 78 comprises shoulder straps (not shown) for securing the upper torso of the child. The shoulder straps and straps may attach by snaps, a clicking mechanism, hook and loop fasteners, buttons, or any other fastening device.

In some embodiments, adjustable backrest 78 comprises adjustable section 80 that slides up and down providing height adjustments to support children of various sizes. Adjustable section 80 may slide under force and maintain position under friction or by any backrest locking mechanism (not shown). A backrest locking mechanism may be a latch provided as a deformable lever with a hook that snaps over protrusion to lock adjustable section 80 in place. A user may press on the lever releasing the latch and press adjustable section 80 to move into a different position. A plurality of heights may be provided for various sizes of children.

In some embodiments, highchair 16 comprises selectively attachable tray 82. Selectively attachable tray 82 may provide a table for the child to eat or play. In some embodiments, selectively attachable tray 82 may comprise clips for snapping onto sidewalls 76. In some embodiments, selectively attachable tray 82 snaps and/or slides onto sidewalls 76.

Figure 5B:
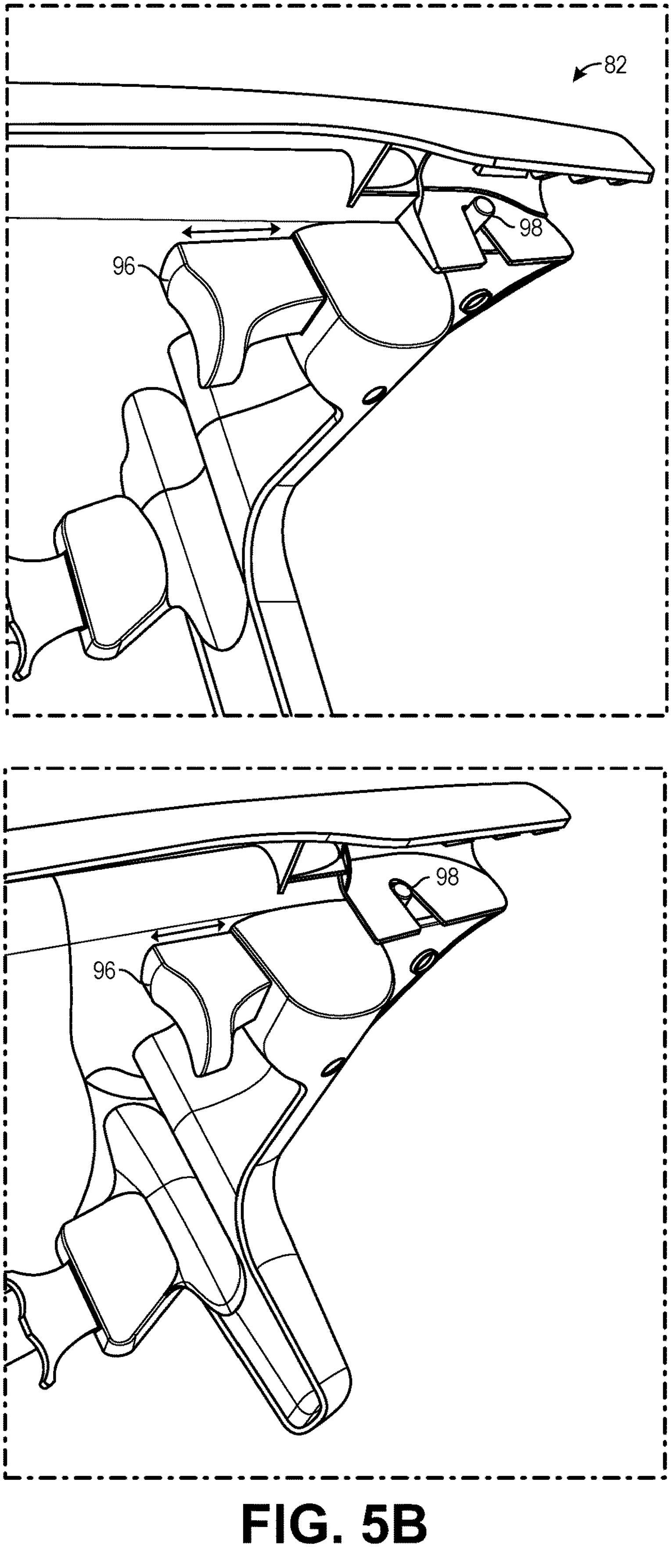
FIG. 5B depicts an exemplary attachment mechanism for an attachment device.

FIG. 5B depicts an exemplary attachment mechanism between selectively attachable tray 82 and sidewalls 76. Selectively attachable tray 76 may comprise lever 96 and pins 98. In some embodiments, selectively attachable tray 82 may slide onto sidewalls 76 and pin 98 may depress, by compressing a spring or lever, into the side of selectively attachable tray 82. Holes (not shown) on sidewalls 76, may be configured to receive pin 98 such that when pin 98 slides over the holes, pin 98 extends into the holes locking selectively attachable tray 82 in place on sidewalls 76.

In some embodiments, lever 96 may be configured to receive a compressive force providing resistance by an internal spring or lever. Lever 96 may be mechanically coupled to pin 98 causing pin 98 to depress when force is applied to lever 96. When lever 96 is pressed, and consequently, pin 98 is depressed, selectively attachable try may easily slide on and off of sidewalls 76.

Figure 6A:
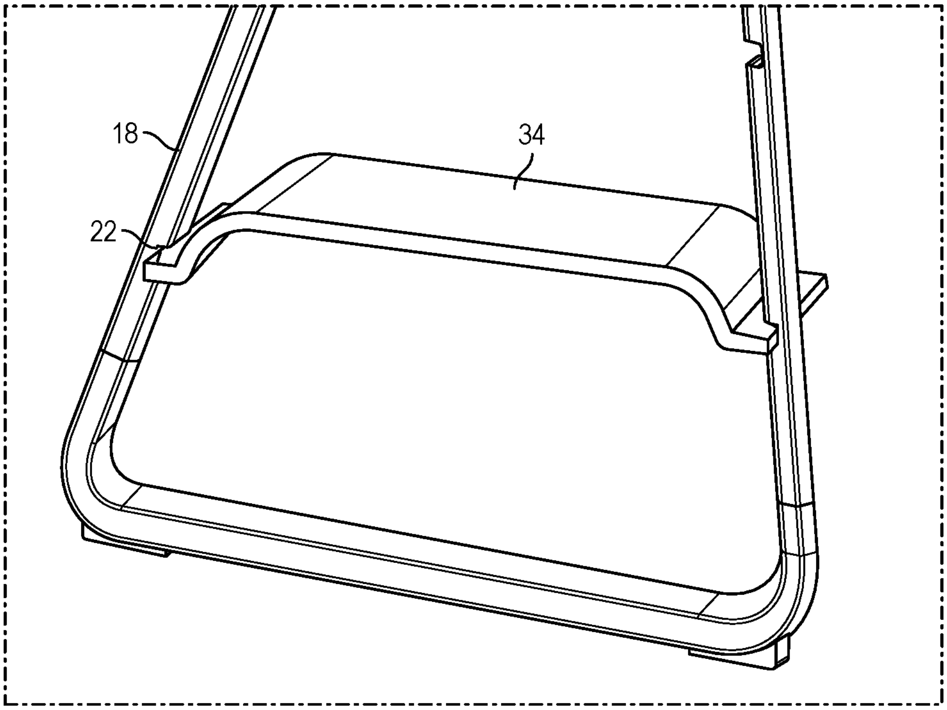
FIGS. 6A and 6B depict an exemplary convertible step for some embodiments of the convertible platform.
Figure 6B:
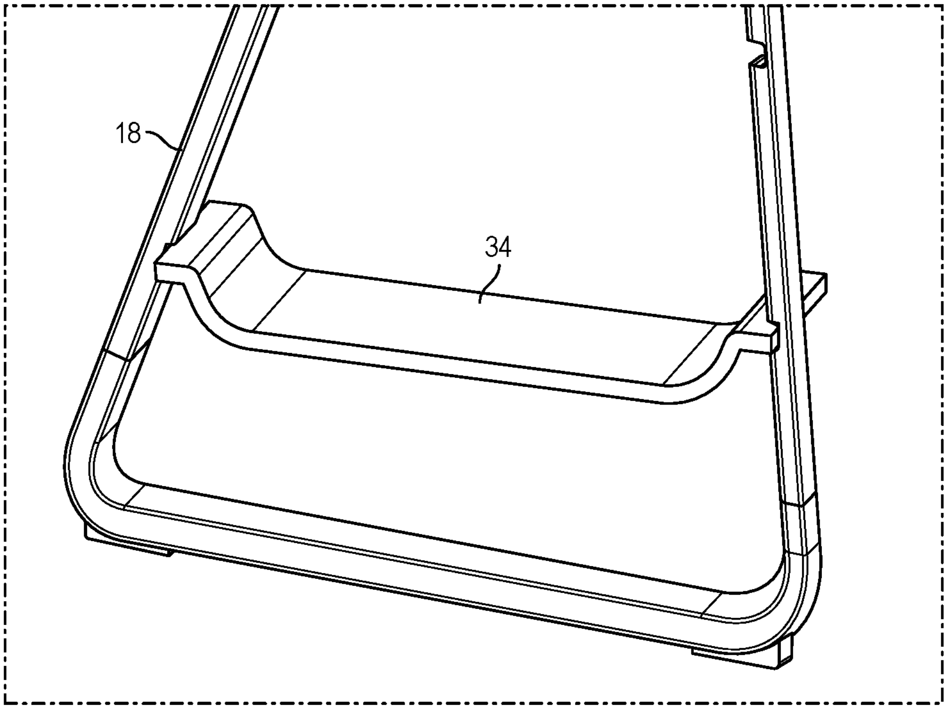

FIGS. 6A and 6B depict an embodiment of step 34. As shown step 34 is a U-shaped step configured to attach between front legs 18. In some embodiments, step 34 may provide incremental height for adjustments for children of various sizes. Step 34 may provide comfortable footrest for children with a knee to foot length that does not exactly fit the incremental locations of attachment points 22. Step 34 provides variety and comfort to children of various sizes.

In some embodiments, step 34 may be an invertible step providing intermediate (at least two) heights between attachment points 22. The invertible step may be U-shaped and may be secured in the grooves of attachment points 22 as described above. Invertible step may provide incremental height changes for the child. FIG. 6A depicts incremental step in an arch configuration and FIG. 6B depicts incremental step in a U-shaped configuration. As step 34 depicted in FIGS. 1-4B provides a platform at each attachment point 22, invertible step may provide a platform halfway between the attachment points 22. Invertible step may be secured into the grooves with the U-shape upright shortening a distance between the user in an attachment device 14 or sitting on platform 36 as shown in FIG. 6A. Alternatively, invertible step may be configured in the U-shaped configuration extending the distance between the invertible step and the user in attachment device 14 or sitting on platform 36. As such, U-shaped step may provide incremental platforms for a child to climb onto platform 36 or attachment device 14. Furthermore, invertible step may provide a platform for the user to rest their feet while sitting on platform 36 or attachment device 14.

Figure 7:
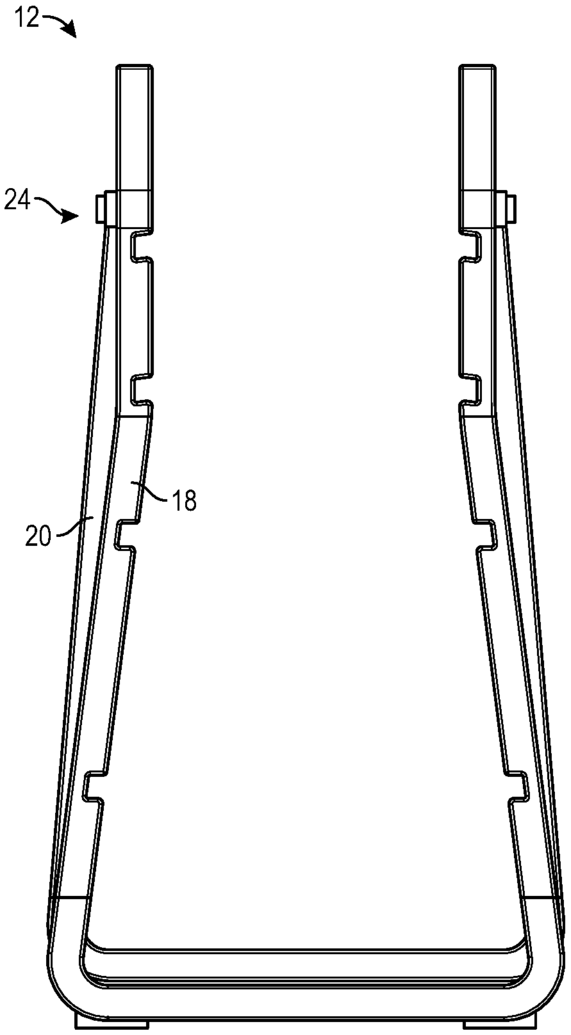
FIG. 7 depicts an exemplary folded configuration for some embodiments of the convertible platform.

FIG. 7 depicts base 12 in a folded configuration for storing. In some embodiments, front legs 18 and back legs 20 may rotate about pivot hinges 24. In some embodiments, pivot hinges 24 may be spring loaded such that, in a locked position, front legs 18 and back legs 20 may be locked together unable to rotate. When force is applied to pivot hinges 24 a locking mechanism may compress the spring and slide inwards releasing front legs 18 from back legs 20 allowing rotation. Furthermore, back legs 20 may be set outside of front legs 18 such that, when rotated, back legs 20 may slide proximate to and on the outside of front legs 18. As such, base 12 may fold into a folded configuration where the space taken by convertible platform 10 is reduced. Any attachment device 14 may be attached or detached while base 12 is in the folded configuration shown in FIG. 7. When front legs 18 and back legs 20 are configured to support attachment device 14, pivot hinges 24 may again be placed into locked position.

In some embodiments, attachment device 14 may various devices for supporting children in various ways and for various purposes. The embodiments of attachment device 14 described herein may not be limiting. For example, attachment device 14 may be a bassinette, a bathtub, a changing table, an easel, an abacus, a drawing board, a touchscreen, or any other device that may support and/or facilitate entertainment, education, and/or any other usage by an infant, toddler, child, or adult. Any of the alternative attachment devices may be attached to base 12 as described above and may be designed relative to angle 26 to provide the necessary configuration for each alternative embodiment. In some embodiments, attachment device 14 may be a car seat and base 12 may be adaptable to attach to the car seat or the car seat may be provided with attachment device members 40 for attaching to base attachment members 28.

Figure 8A:
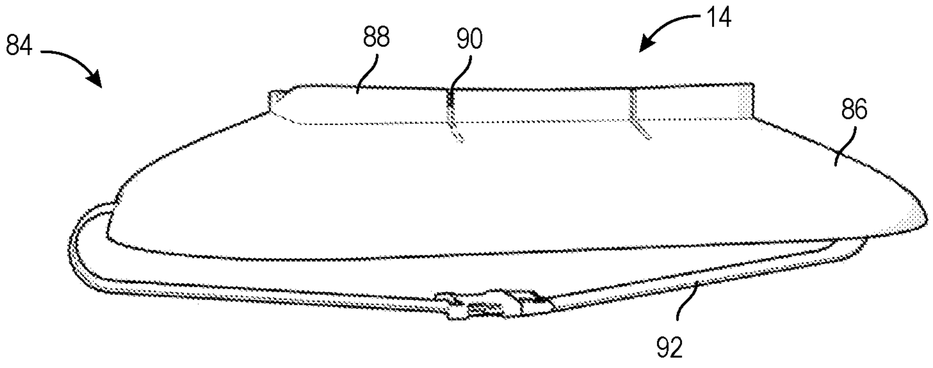
FIGS. 8A-8C depict an exemplary convertible base platform for receiving and supporting attachment devices.
Figure 8B:
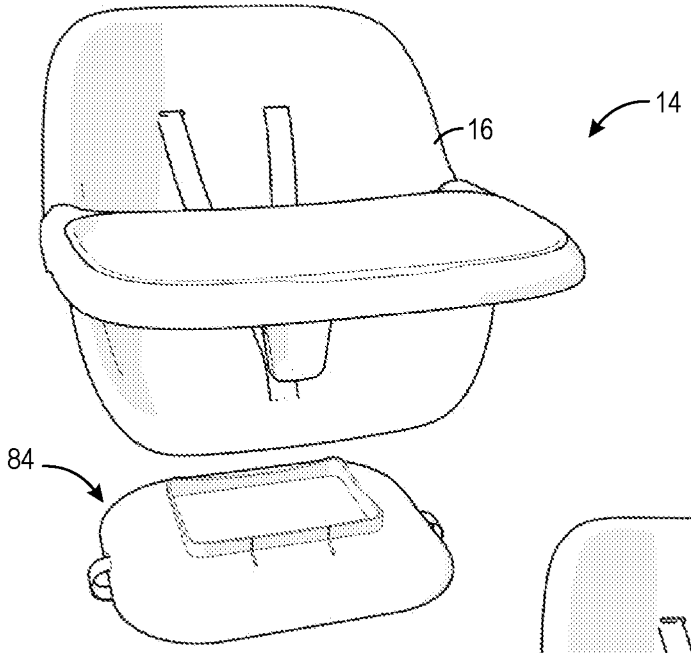
Figure 8C:
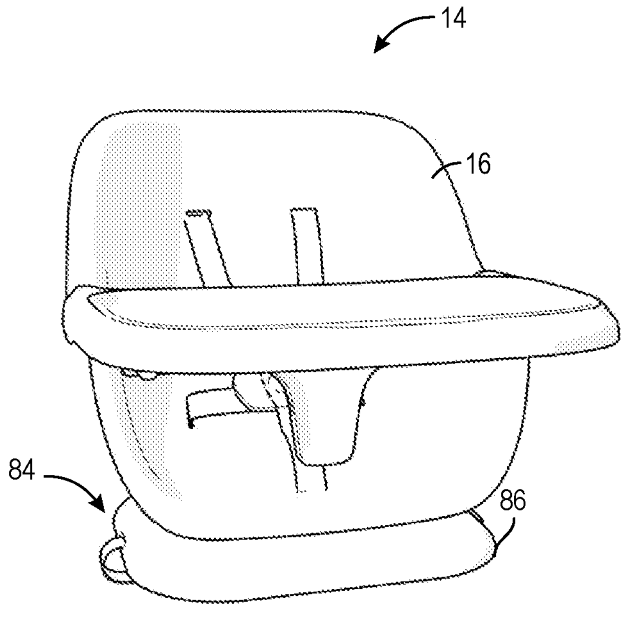

FIGS. 8A-8C depict convertible base platform 84 for coupling to and supporting attachment device 14 on a surface. In some embodiments, convertible base platform 84 may comprise base platform 86 configured to rest on a surface and provide support for attachment device 14, a user, and/or an object. In some embodiments, attachment device 14 may be highchair 16 as shown or any other attachment device 14 as described herein. In some embodiments, convertible base platform 84 comprises base attachment portion 88 comprising at least one slot 90 for receiving an attachment portion (not shown) of attachment device 14.

In some embodiments, base attachment portion 88 may be a rectangular protrusion comprising slots 90. The rectangular protrusion may similarly be provided by attachment portion of attachment device 14. In some embodiments, attachment portion of attachment device 14 may be slightly larger or slightly smaller than base attachment portion 88 providing a secure attachment. In some embodiments, rectangular protrusion may be any shape including square, triangle, round, any polygon, irregular, or any other shape. Further, attachment portion of attachment device 14 may be a similar shape for providing translational and rotational resistance to prevent tipping and for securing convertible base platform to attachment device 14.

In some embodiments, the attachment portion of attachment device 14 may provide at least one protrusion for receiving by at least one slot 90. The at least one protrusion may slide securely into slot 90 providing additional translational and rotational support. Therefore, attachment device 14 may securely attach to convertible base platform 86 for supporting the user or object.

In some embodiments, convertible base platform 84 comprises strap 86 for securing convertible base platform 84 to the surface. In some embodiments, strap 92 may be a plurality of straps. Strap 92 may comprise any material including fabric and plastic that may be pliable enough to wrap the surface and strong enough to secure convertible base platform 84. In some embodiments, the surface may be a floor, a chair, a table, or the like. The surface may be any substantially flat surface sufficient to support convertible base platform 84, attachment device 14, and any user or object described herein. In cases where the surface is a chair, table, or other object that is elevated from the floor. Strap 90 may wrap the elevated object to provide additional translational and rotational resistance to prevent sliding and tipping.

Figure 9:
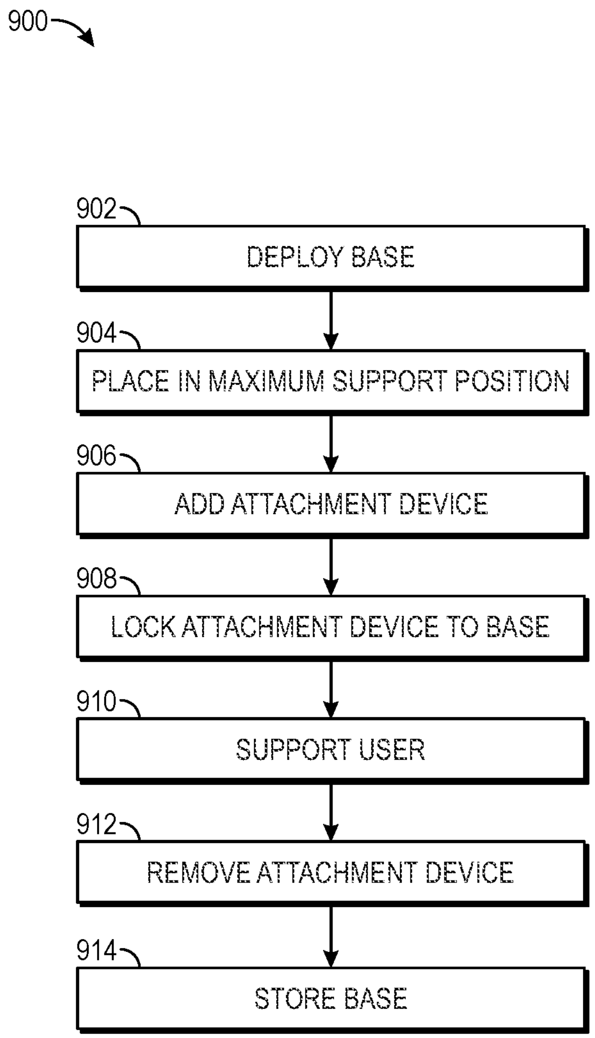
FIG. 9 depicts an exemplary method of deployment of the convertible platform to support a user.

FIG. 9 depicts an exemplary method 900 of deploying base and changing attachment device. At step 902 base 12 may be reconfigured from a folded configuration to a deployed configuration. In some embodiments, a user may activate pivot hinges 24 to allow front legs 18 to rotate relative to back legs 20 about pivot hinges 24. As front legs 18 rotate relative to back legs 20 angle 26 may become larger providing a wide support base for base 12 to stand. Base 10 may sit in an upright position with footings 32 on the floor at a distal end of front legs 18 and with base attachment members 38 at a proximal end of front legs 18. Base attachment members 38 may be positioned for receiving attachment device 14.

At step 904, base may be locked into place at a maximum or a desired angle of angle 24. The maximum angle may be provided by a stopping mechanism stopping the rotation of front legs 18 relative to back legs 20 or may be provided by a locking mechanism that may be automatic or manual. The locking mechanism for pivot hinges may lock according to embodiments described above. Pivot hinges 24 may lock to provide a stable 24 foundation for base 12 to support attachment device 14 and the user. Furthermore, pivot hinges 24 may be locked at angle 26 providing the proper angle for attachment device 14 to be a desired angle and attachment points 22 to be substantially parallel to the floor.

At step 906, attachment device 14 and other attachments may be added to base 12 to complete deployment of convertible device 10. Once base 12 is deployed, attachment device 14, platform 36, step 34, and any other attachments may be added to base 12. Step 34 and/or platform 36 may be added at attachment points 22 providing grooves parallel to the floor. Step 34 and platform 36 may be provided substantially parallel to the floor by any of attachment points 22.

Attachment device 14 may be attached to base 12 by the above-described interactions between attachment device attachment members 38 and base attachment members 40. Attachment device 14 may be any of highchair 16, guard rail 46, backrest 52, or any other attachment device 14 described above. At step 908, attachment device 14 may be locked into place on base 12 by the interaction between base locking mechanisms 42 and attachment locking mechanisms 44 as described in embodiments above.

At step 910, the user may be supported by convertible platform 10. In some embodiments, the user may climb step 34 and platform 36 to sit in, or otherwise be supported by, attachment device 14. As described above, in some embodiments, the user may sit in highchair 16, sit on platform 36, stand on platform 36, and hold guard rail 46.

When the user has finished with convertible platform 10, at step 912, the user may exit convertible platform 10 and attachment device 14, step 34, and platform 36 may be removed. Attachment device 14 may be removed by engaging attachment locking mechanisms 44 and/or base locking mechanism 42 to release attachment device 46 as described above.

At step 914, convertible platform 10 may be placed into the folded configuration and stored. Pivot hinges 24 may be engaged to release pivot hinge locking mechanism allowing front legs 18 to rotate relative to back legs 20 about pivot hinge 24. Front legs 18 may be slightly narrower than back legs 20 proximate pivot hinge 24 allowing back legs 20 to fold close to front legs 18 allowing a small configuration that may be take up less space than the deployed configuration of convertible platform 10.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. A convertible platform for supporting a user in a seated position or a standing position, the convertible platform comprising:
- a base comprising:
  - a set of front legs and a set of back legs,
  - wherein the set of front legs comprise a distal end proximate a surface supporting the convertible platform and a proximal end opposite the distal end;
  - attachment points disposed on each front leg of the set of front legs at the proximal end;
  - a platform attached to each front leg of the set of front legs at the attachment points,
    - wherein the platform comprises a spring-loaded protrusion interacting with the set of front legs and/or the set of back legs for locking the platform in place;
  - a pivot hinge connecting the set of front legs and the set of back legs and providing rotation of the set of front legs relative to the set of back legs; and
  - base attachment members,
  - wherein the base attachment members are an extension of the set of front legs at the proximal end; and
- an attachment device for attaching to the base and supporting the user,
- the attachment device comprising attachment device attachment members configured to attach to the base attachment members,
- wherein the attachment device is configured to support the user in a standing or sitting position.

2. The convertible platform of claim 1,
- wherein the base attachment members are hollow and receive the attachment device attachment members; and
- further comprising a set of attachment locking mechanisms and a set of base locking mechanisms configured to lock the attachment device on the base.

3. The convertible platform of claim 1, wherein the attachment device is a highchair.

4. The convertible platform of claim 3, wherein the highchair comprises:
- a U-shaped seat and sidewalls for securing a child in the highchair;
- an adjustable backrest for adjusting based on a height of the child; and
- a selectively attachable tray configured to attach to the sidewalls.

5. The convertible platform of claim 1, wherein the attachment device is a guard rail and is attached at a height for gripping by a child when the child is standing on the platform.

6. The convertible platform of claim 5, wherein the guard rail provides 180-degree support around the child.

7. The convertible platform of claim 1, wherein the attachment device is a backrest, and the platform provides a seat that is substantially parallel with the surface.

8. The convertible platform of claim 1,
- wherein the attachment device is disposed in a reclined position based on a first angle between the set of front legs and the set of back legs, and
- wherein the first angle provides a second angle of the base attachment members relative to the surface.

9. The convertible platform of claim 1, wherein the set of front legs rotate relative to the set of back legs to provide a folded configuration of the base for storage.

10. A convertible platform for supporting a user in a seated position or a standing position, the convertible platform comprising:
- a base comprising:
  - a set of front legs and a set of back legs,
  - wherein the set of front legs comprise a distal end proximate a surface supporting the convertible platform and a proximal end opposite the distal end;
  - attachment points disposed on an inner side of each front leg of the set of front legs;
  - a platform attached to each front leg of the set of front legs at the attachment points,
    - wherein the platform comprises a spring-loaded protrusion interacting with the set of front legs and/or the set of back legs for locking the platform in place;
  - a pivot hinge connecting the set of front legs and the set of back legs and providing rotation of the set of front legs relative to the set of back legs; and
  - base attachment members,
  - wherein the base attachment members are a linear extension of the set of front legs at the proximal end;
- an attachment device for attaching to the base and supporting the user,
- the attachment device comprising attachment device attachment members configured to attach to the base attachment members,
- wherein the attachment device is configured to support the user in a standing or sitting position.

11. The convertible platform of claim 10,
- wherein the base attachment members are hollow and receive the attachment device attachment members; and
- further comprising:
  - a set of attachment locking mechanisms and a set of base locking mechanisms configured to lock the attachment device on the base.

12. The convertible platform of claim 11, wherein the set of attachment locking mechanisms is a set of spring-loaded pins and the set of base locking mechanisms is a set of holes configured to receive the set of spring-loaded pins.

13. The convertible platform of claim 10,
- wherein the attachment device is disposed in a reclined position based on a first angle between the set of front legs and the set of back legs, and
- wherein the first angle provides a second angle of the base attachment members relative to the surface.

14. The convertible platform of claim 10,
- wherein the attachment device is a guard rail and is attached at a height for gripping by a child when the child is standing on the platform,
- wherein the guard rail provides 360-degree support around the child.

15. A convertible platform for supporting a user in a seated position or a standing position, the convertible platform comprising:
- a base comprising:
  - a set of front legs and a set of back legs,
  - wherein the set of front legs comprises a distal end proximate a surface supporting the convertible platform and a proximal end opposite the distal end;
  - attachment points disposed on each front leg of the set of front legs;

a platform attached to each front leg of the set of front legs at the attachment points, wherein the platform comprises a spring-loaded protrusion interacting with the set of front legs and/or the set of back legs for locking the platform in place;

a pivot hinge connecting the set of front legs and the set of back legs and providing rotation of the set of front legs relative to the set of back legs; and base attachment members configured to receive an attachment device for supporting the user, wherein the base attachment members are an extension of the set of front legs at the proximal end.

16. The convertible platform of claim 15, wherein the base attachment members are a linear extension of the set of front legs, wherein the attachment device is disposed in a reclined position based on a first angle between the set of front legs and the set of back legs, and wherein the first angle provides a second angle of the base attachment members relative to the surface.

17. The convertible platform of claim 15, wherein the platform is secured in the attachment points substantially parallel to the surface.

18. The convertible platform of claim 15, wherein the attachment points are a first set of attachment points and further comprising:

a second set of attachment points disposed in the set of front legs; and a step connected to the second set of attachment points.

19. The convertible platform of claim 18, wherein the step is U-shaped and invertible providing at least two platform heights between heights of the second set of attachment points.

20. The convertible platform of claim 15, wherein the set of front legs rotate relative to the set of back legs to provide a folded configuration of the base for storage.

* * * * *